United States Patent [19]

Bordignon

[11] 4,456,344

[45] Jun. 26, 1984

[54] FRESNEL LENS, AND A METHOD AND MOLD FOR MANUFACTURING IT

[75] Inventor: Abramo Bordignon, Senago, Italy

[73] Assignee: A.T.B. S.p.A., Senago, Italy

[21] Appl. No.: 307,127

[22] Filed: Sep. 29, 1981

[30] Foreign Application Priority Data

Jul. 23, 1981 [IT] Italy ................................ 23098 A/81

[51] Int. Cl.³ ................................................ G02B 3/08
[52] U.S. Cl. ........................................ 350/452; 264/1.1
[58] Field of Search ............................ 350/452; 264/1.1

[56] References Cited

U.S. PATENT DOCUMENTS

2,510,344  6/1950  Law ..................................... 350/452

FOREIGN PATENT DOCUMENTS

902370  12/1944  France ................................. 350/452

OTHER PUBLICATIONS

Miller et al., "Thin Sheet Plastic Fresnel Lenses of High Aperture," Journal of the Optical Society of America, vol. 41, No. 11, 11/1951, pp. 807–814.

*Primary Examiner*—John K. Corbin
*Assistant Examiner*—Rebecca D. Gass
*Attorney, Agent, or Firm*—Guido Modiano; Albert Josif

[57] ABSTRACT

The Fresnel lens is provided, as viewed in cross-section, with a face formed with a plurality of spirally arranged teeth, each whereof includes a light ray refracting portion and a connection flank to the next adjacent refractive portion, in each tooth the angle included between any such refractive portions and the adjoining connection flank being less than 90°.

1 Claim, 10 Drawing Figures

FRESNEL LENS, AND A METHOD AND MOLD FOR MANUFACTURING IT

BACKGROUND OF THE INVENTION

This invention relates to an improved Fresnel lens, as well as to a method and mold for manufacturing it.

It is known to use, in order to cut down the weight and cost of wide aperture lenses, so-called Fresnel lenses which comprise a central lenticular portion surrounded by concentrically arranged prismatic rings. In actual practice, Fresnel lenses of this general type are usually provided with a first smooth face, of either flat or conical or frustum or spherical configuration, and second face formed with a series of saw-like teeth encircling a centrally located core lens. These teeth extend across their related Fresnel lens face as a set of concentrical rings comprising a refractive portion, which has an inclination arranged to vary from one tooth to the next, or between concentrical rings, and a connection slope or flank in the form of a steeply inclined front arranged to interconnect the refractive portion of one tooth with the refractive portion of an adjacent tooth.

The optical quality of Fresnel lenses essentially depends on the shape of said teeth, and in particular of said connection slopes or flanks which—performing no optical functions, but merely that of interconnecting two consecutive refractive portions together—are required to interfere as little as possible with the light path. In ideal technical conditions, said connection slopes or steep fronts of the teeth should extend substantially parallel to the direction of the light beam which is being transmitted through the lens, so as to induce the least possible disturbance. However, this optimum situation can not be achieved in actual practice, where Fresnel lenses of conventional design are manufactured with molding techniques, utilizing materials with a suitable refractive index. In fact, molding implies design limitations arising from mold withdrawal requisites, so that said steep front must be suitably located for withdrawal from the mold. Actually, the aforesaid steep front or connection slope is prevented from following the true light path through thus produced Fresnel lenses, and happens to interfere with said light path, so that optical performance is affected.

The above situation is further aggravated by the unavoidable presence of radiused inner and outer corner edges on said teeth, which further reduces the useful refractive portions.

SUMMARY OF THE INVENTION

In view of the foregoing, and of the interest attached to molded Fresnel lenses, on account both of their low cost and of the possibility that they afford, among other things, of producing wide aperture lenses, it is a primary object of this invention to provide an improved Fresnel lens, whereby optical disturbance factors can be minimized, without adding to the difficulties inherent to the molding operations.

It is a further object of the invention to provide a method, and a mold, which enable the formation of said improved Fresnel lens and are simple to implement and use.

These and other objects, such as will be apparent hereinafter, are all achieved by an improved Fresnel lens according to the invention, which is provided with a first smooth face and a second face comprising, in cross-section, a plurality of teeth, each of said teeth having a portion effective to refract light rays onto a focus and a slope or flank of connection to the refractive portion of an adjacent tooth, characterized in that in each said tooth the groove angle i.e. the angle included between said refractive portion and said connection slope or flank is less than 90 degrees, and in that said teeth are arranged on said second face in such a way as to follow a spiralling pattern.

Advantageously, the inventive method for manufacturing the foregoing improved Fresnel lens is characterized in that it comprises the steps of: forming the lens between two mutually facing elements; and separating that of said facing elements which defines the lens toothed face by rotating the lens about the central axis thereof relatively to the last mentioned element.

BRIEF DESCRIPTION OF THE DRAWINGS

Further features and advantages of this invention will be more clearly apparent from the following description of a preferred, but not limitative, embodiment thereof, as illustrated by way of example only in the accompanying drawings, where.

DESCRIPTION OF THE PREFERRED EMBODIMENTS

Figure 1:
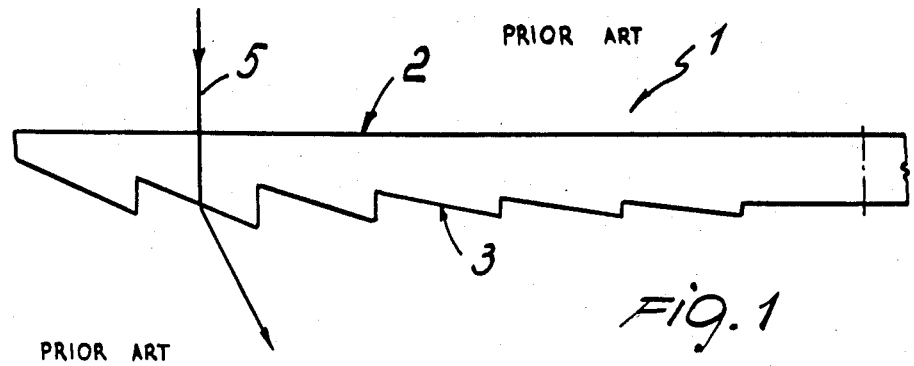
FIGS. 1 and 1a are major portion and enlarged detail views, respectively, of a conventional Fresnel lens of the flat or planar type.
Figures 1A, 1B:
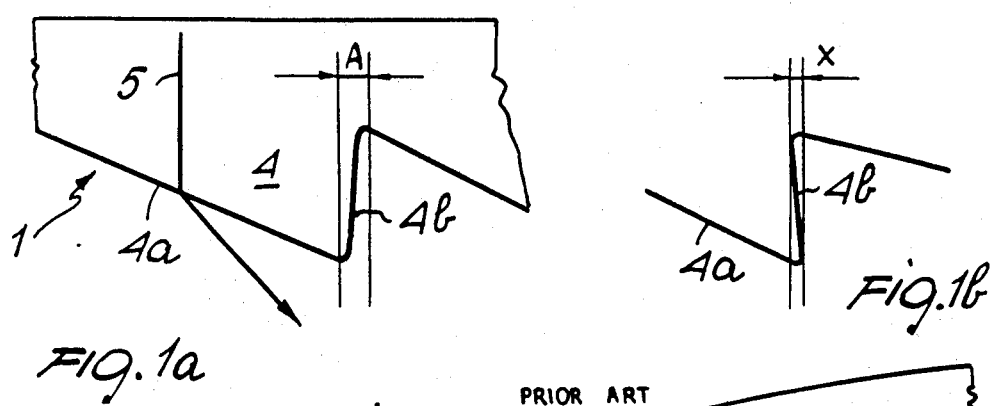
FIG. 1b shows schematically, and with reference to FIG. 1a, an ideal section profile for a Fresnel lens of the planar type.

With reference to FIGS. 1, 1a, 2, 2a, there are evidenced for comparison purposes the conventional design of Fresnel lenses and the drawbacks affecting it. FIGS. 1 and 1a, in particular, show a Fresnel lens 1 of the planar type, namely one having a first face 2 which is flat and a second face 3 which is formed with steps or teeth 4, each of said steps or teeth comprising a refractive portion 4a and connection flank or slope 4b. Light rays 5 passing through the planar lens 1 undergo no deviations within the lens itself, and accordingly the disturbance induced by the connection flanks 4b is relatively small, as shown in FIG. 1a. Actually, any disturbance would only be attributable to slight negative-going ramps on the flanks 4b, and above all, to the areas affected by the radiusing of the corner edges. The last mentioned areas are comparatively broad ones, because the radiused regions cannot overlap each other owing to the presence of the cited slight negative-going angles of attack of the flanks 4b.

Figure 2:
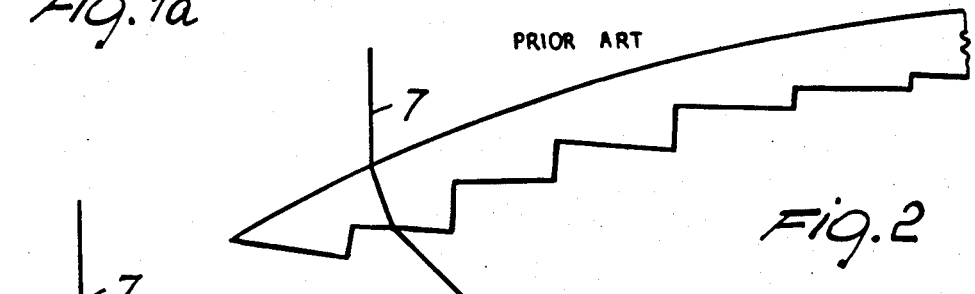
FIGS. 2 and 2a are major portion and enlarged detail views, respectively, of a Fresnel lens of the spherical type.
Figures 2A, 2B:
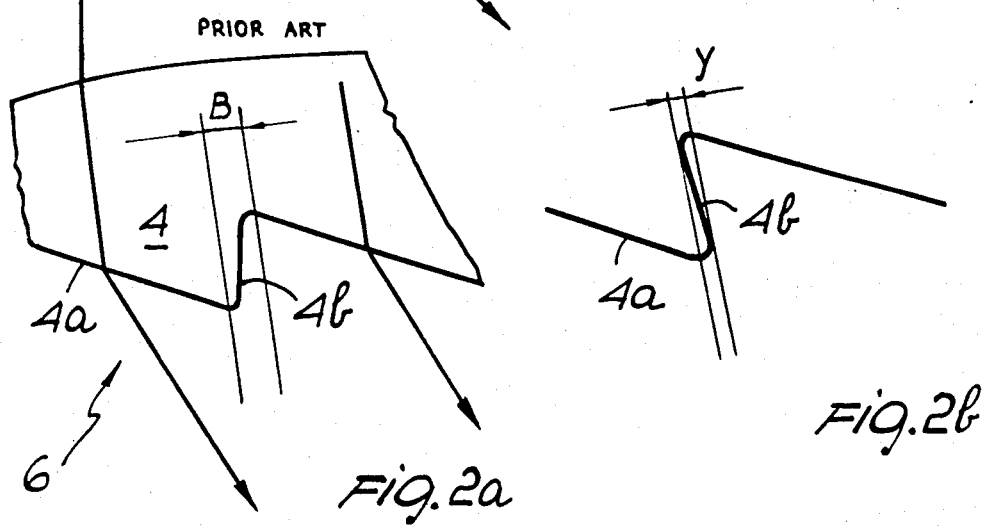
FIG. 2b shows, with reference to FIG. 2a, an ideal section profile for the above spherical Fresnel lens.

FIGS. 2 and 2a are similar representations of a Fresnel lens of the spherical type, as indicated at 6, wherein an incident light ray 7 undergoes a deviation in flowing through the lens. In this instance, the flank 4b of each tooth 4 is allowed to interfere with the light beam to an even larger extent than is apparent from the planar Fresnel lens of FIGS. 1 and 1a.

In FIG. 2a, the reference character B designates the area of negative interference with the light path, and this area is larger than the corresponding area A of FIG. 1a, owing to the steeper inclination of the flank 4b relative to the light ray 7, which steeper inclination is due to the light rays 7 being deviated increasingly more toward the edges of the lens.

FIGS. 1b and 2b illustrate ideal theoretical shapes for the teeth 4, effectively minimizing interference with the light beam by the flanks 4b. In actual practice, the flanks 4b should be so inclined as to bring the radiused areas to overlap each other relatively to the direction of the light path through the lens, thus restricting the interference to respective regions X and Y having a width dimension which corresponds to a single radiused area.

However, the above ideal solution would not be feasible with currently available molded construction lenses, because it requires more or less deep undercuts which are bound to hinder the withdrawal of the lens from that mold which forms the toothed or serrated face thereof.

FIGS. 3, 3a, 4, 4a show how the improved Fresnel lenses of this invention obviate the technical problem posed by said undercuts, thus making the ideal section profiles 1b and 2b feasible.

Figure 3A:
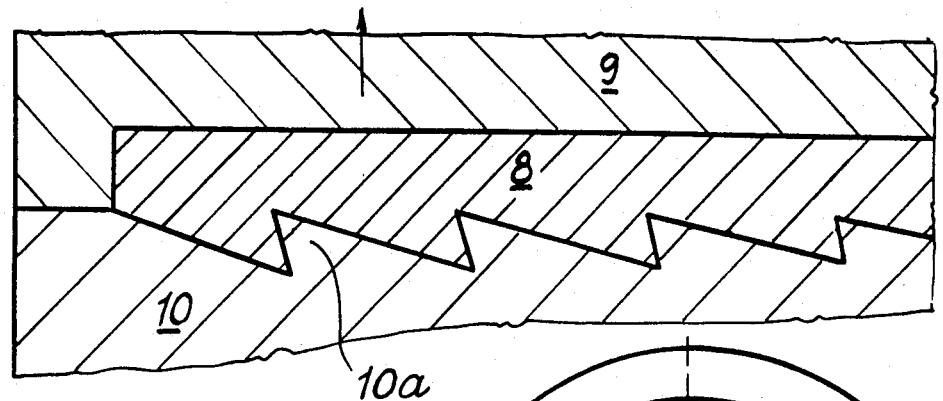
FIG. 3a shows the lens of FIG. 3 as inserted between two mold halves.
Figures 3, 4:
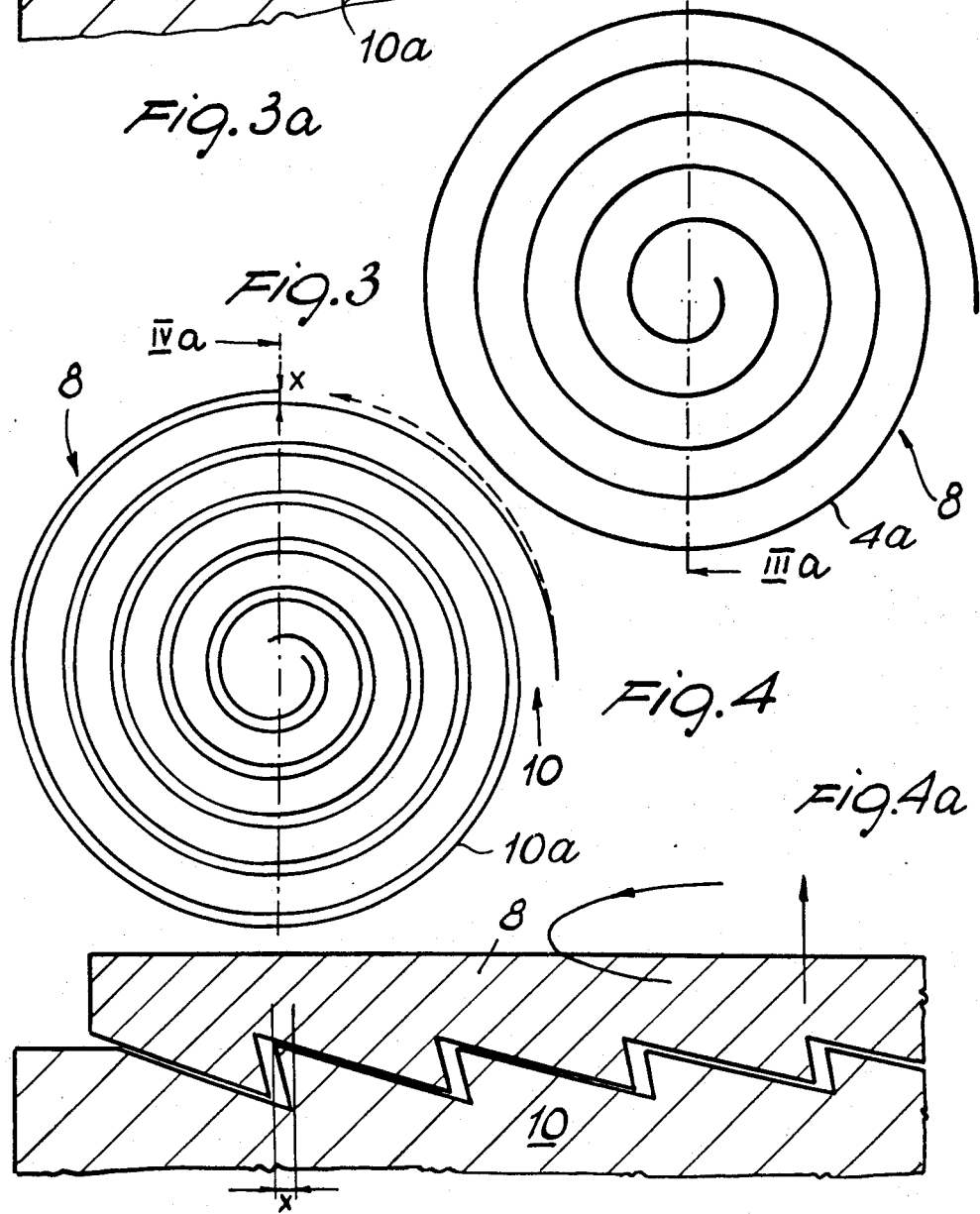
FIG. 3 is a front view schematically illustrating a Fresnel lens of improved design according to this invention.
FIG. 4 illustrates the lens of FIG. 3a during the withdrawal step from a mold.

FIG. 3, in particular, shows how the second or toothed face 3 of the inventive Fresnel lens 8—which for illustration purposes happens to be a planar one, but may be conical or spherical, as desired—is provided with teeth 4 generally defining a spiral pattern, and specifically a constant pitch spiral. As visible in FIG. 3 the teeth 4 are formed by a spirally wound groove 4a, the groove having a sidewall forming an angle of less than 90° with respect to the main surface extension of the lens.

By virtue of this novel design, which is highly different from any known ones where the teeth 4 were used to form concentrical rings, a method of manufacturing Fresnel lenses becomes applicable whereby the molding step proper (FIG. 3a) is followed by a step of withdrawal or separation of the lens 8 from one forming element by relative rotation of the resulting lens (FIG. 4). This rotation, as is also evidenced in FIG. 4a, results in an offset relationship and removal of the turns of the lens 8 away from the mold turns. In fact, and in a known manner, the spiralling turns have a gradually decreasing radius of curvature, and said offset relationship brings areas of the lens 8 with given curvature radii into alignment with areas of the mold having smaller radii of curvature.

Figure 4A:
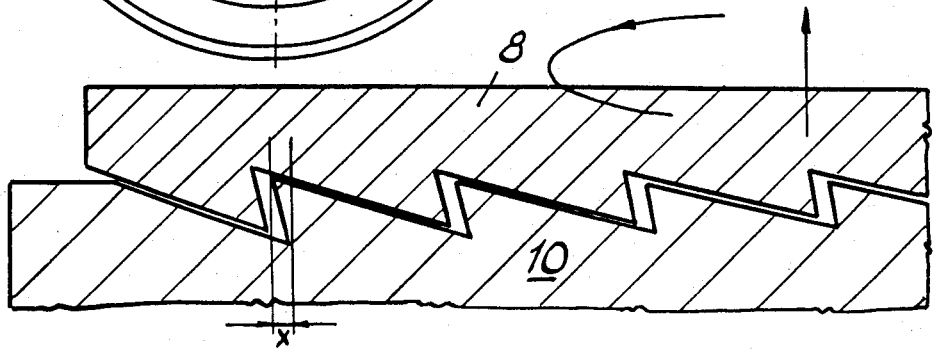
FIG. 4a is a front view showing schematically the lens of FIG. 4 while being withdrawn from the mold.

As shown in FIGS. 4 and 4a, the mutual offsetting of the lens 8 and mold may be relatively small in magnitude, such as to exceed the width X of the largest undercut, as the latter changes. As visible in FIG. 3a owing to such undercuts a snapping engagement occurs between the lens molding 8 and the mold half 10 which prevents withdrawal of the lens molding in the direction of the arrow of FIG. 3.

Advantageously, the mold for implementing this method comprises a first mold half 9 adapted to define the smooth face and side edges of the Fresnel lens, a second mold half 10 provided with a spiral rib 10a adapted to define the toothed or serrated face of the lens 8, and means operative to produce a relative rotation of the lens 8 and second mold half 10. This means are not shown, and may be in the form of dowel pins protruding from the lens, or of holes to be engaged with a suitable tool. In a more suitable manner, this means may be directly connected to the first mold half 9 which, as it is moved away, can perform a partial rotation movement.

The improved Fresnel lens according to the invention fully achieves its objects.

With the spiral pattern design provided, it becomes possible to impart to the lens teeth the shape shown in FIGS. 1b and 2b, while concurrently forming the lens by the molding process; the spiral pattern allows the removal of the lens by simply screwing the lens out, notwithstanding the undercuts required for an optimum shaping of the lens.

The invention as described is susceptible to many modifications and variations, without departing from the inventive concept underlying it. Moreover, all of the details may be replaced with other equivalent elements, the technical solutions proposed being, of course, applicable to any lenses and articles which pose comparable molding problems.

In practicing the invention, the materials used and the dimensions may be any suitable ones for the intended application.

I claim:

1. A method for manufacturing a Fresnel lens with a groove pattern in the form of a groove having the shape of a continuous spiral having a center and turns surrounding said center, said groove having a side wall forming an angle of less than 90° with respect to the main lens surface extension thereby defining an undercut formation along the groove, the method comprising the steps of molding said lens between two mold halves facing each other, at least one thereof having a pattern in the form of a rib with the shape of said continuous spiral groove and with a lateral surface having an inclination corresponding to said angle thereby to form said undercut, the sprital rib thereby engaging said spiral groove of the lens molding with a mutually snapping relationship upon formation of said spiral groove, and separating said lens so formed from said spiral rib presenting mold half by performing a relative rotation between said lens and said spiral rib presenting mold half and withdrawing the lens from the mold.

* * * * *